May 15, 1962 G. R. BUNN 3,034,418
COFFEE HOLDING MEANS
Original Filed April 2, 1959 2 Sheets-Sheet 1
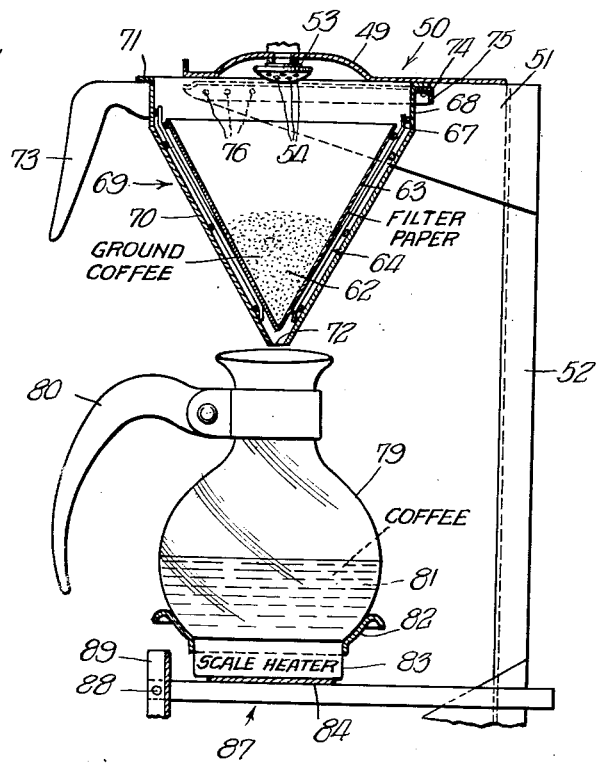
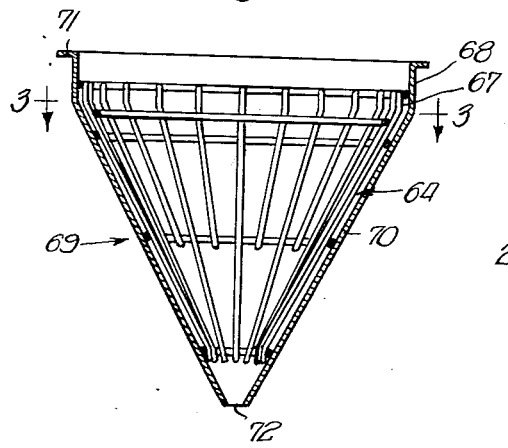
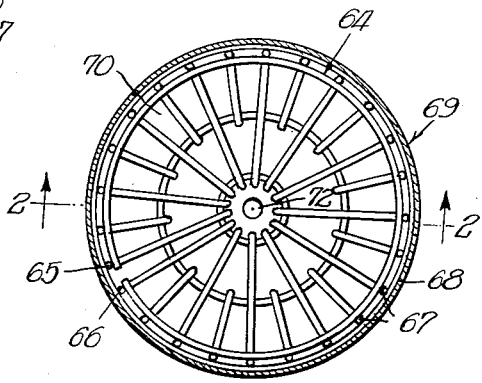
INVENTOR.
George R. Bunn.
BY Robert R. Lockwood
Atty.

May 15, 1962 G. R. BUNN 3,034,418
COFFEE HOLDING MEANS
Original Filed April 2, 1959
2 Sheets-Sheet 2
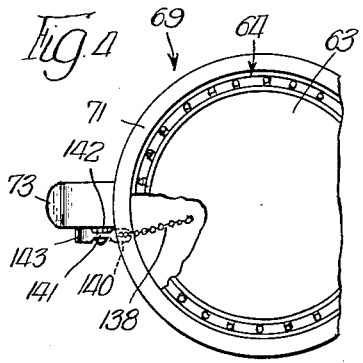
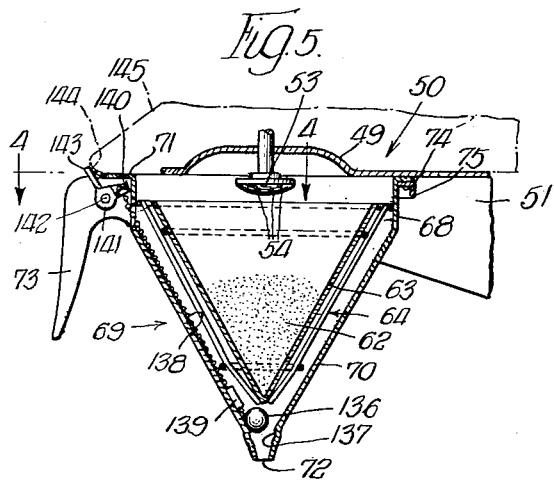
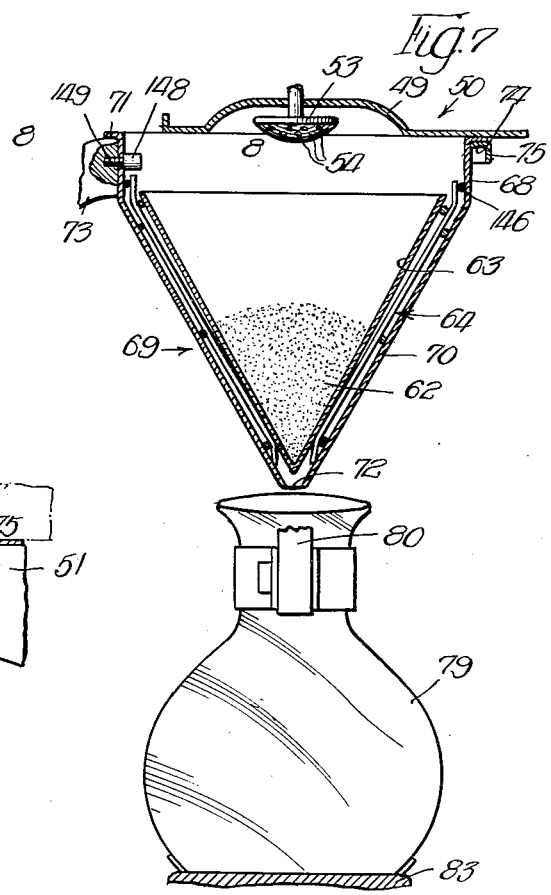
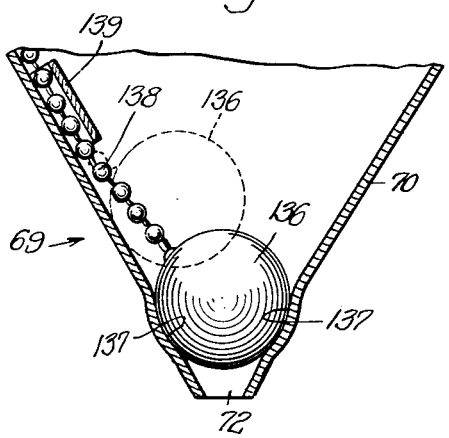
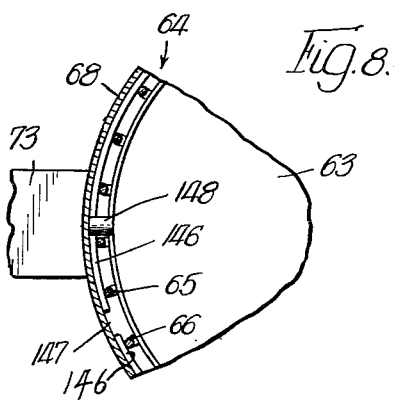
INVENTOR.
George R. Bunn,
BY
Robert R. Lockwood
atty.

United States Patent Office 3,034,418
Patented May 15, 1962

3,034,418
COFFEE HOLDING MEANS
George R. Bunn, 927 E. Adams St., Springfield, Ill.
Original applications Apr. 2, 1959, Ser. No. 725,813, Sept. 8, 1959, Ser. No. 839,047, and Jan. 8, 1960, Ser. No. 1,200. Divided and this application Sept. 27, 1960, Ser. No. 58,775
11 Claims. (Cl. 99—323)

This invention relates to coffee holding means and is a continuation-in-part of application Serial No. 814,877 filed May 21, 1959, now abandoned, and which is a division of application Serial No. 725,813, filed April 2, 1959, now abandoned. This application also is a division of application Serial No. 839,047, filed September 8, 1959, and also is a division of application Serial No. 1,200, filed January 8, 1960.

Among the objects of this invention are: To provide a filter in the form of one or more layers of filter paper in a funnel arranged to receive ground coffee over which hot water is sprayed; to space the filter paper from the surface of the funnel in such manner as to facilitate the flow of coffee through the filter at a relatively high rate and over a relatively large area; to provide for disposing of the spent coffee grounds by inversion of the funnel and thereby also discarding the filter; to prevent dripping of coffee from the funnel after it is removed from operative position on the coffee making machine; to provide a self sealing valve at the bottom of the funnel for this purpose that is automatically closed when the funnel is removed and is automatically opened when the funnel is placed in operative position on the coffee making machine; and to positively hold the conical wire grill on which the conical filter paper is supported in the funnel when the funnel is turned upside down to discharge the filter and spent coffee grounds thereon.

In the drawings:

FIG. 1 is a view, partly in side elevation and partly in section showing a portion of a coffee making machine the complete details of construction of which are set forth in application Serial No. 839,047, filed September 8, 1959, this particular figure showing in section the construction of the funnel and wire grill thereon for holding the filter and in elevation the beaker which is positioned under the funnel for receiving the liquid coffee.

FIG. 2 is a vertical sectional view taken generally along the line 2—2 of FIG. 3, and showing in more detail the construction of the funnel and the wire grill positioned therein.

FIG. 3 is a horizontal sectional view taken generally along the line 3—3 of FIG. 2.

FIG. 4 is a partial sectional view taken generally along the line 4—4 of FIG. 5 and showing a modified construction of the funnel.

FIG. 5 is a vertical sectional view of the modified funnel construction shown in FIG. 4 and illustrating the ball valve in the open position which closes off the opening at the bottom of the funnel when it is removed from the coffee making machine.

FIG. 6 is a vertical sectional view, at an enlarged scale, of the lower end of the funnel shown in FIGS. 4 and 5 and illustrating how the ball valve closes the lower end of the funnel.

FIG. 7 is a view, somewhat similar to FIG. 1, and showing a modified funnel construction employing a grill retaining stud for positively preventing the movement of the conical wire grill out of the funnel when it is turned upside down.

FIG. 8 is a horizontal sectional view taken generally along the line 8—8 of FIG. 7.

Insofar as possible the reference characters employed in application Serial No. 839,047, filed September 8, 1959, are employed herein. Reference can be had to that application for a description of the coffee making machine with which the present invention is employed.

Referring now particularly to FIGS. 1, 2 and 3 of the drawings, it will be noted that the coffee making machine includes an upwardly deformed portion 49 of a hood, shown generally at 50, which has depending sides 51 that are secured to and carried by frame uprights 52 which form a part of the frame for the coffee making machine. Positioned within the deformed portion 49 of the hood 50 is a spray head 53 that is provided with spray openings 54 through which hot water flows downwardly and outwardly over a substantial area.

The hot water from the spray openings 54 sprays over ground coffee 62 a quantity of which is positioned in the lower end of a disposable conical filter 63, preferably formed of one or more layers of filter paper. The filter 63 is located centrally underneath the spray head 53 and it is supported on a resilient conical wire grill 64 the details of construction of which are shown more clearly in FIGS. 2 and 3. As there shown the wire grill 64 is formed of various lengths of wire which extend in spaced relation lengthwise of the conical surfaces and are secured together in spaced relation by circularly extending wire supports. Preferably the wire grill 64 is formed of stainless steel or like material. It is resilient and flexible and has spaced longitudinally extending sides 65 and 66, formed by lengthwise extending wires which can be moved toward each other for a purpose that will be apparent presently. The wire grill 64 is of conical shape for the lower principal part and it has a cylindrical top section 67 for interfitting with a cylindrical upper end 68 of a funnel, shown generally at 69, which has a conical body portion 70, a radial flange 71 around the upper periphery and a discharge opening 72 at the bottom. Since the wire grill 64 is resilient and the sides 65 and 66 are spaced apart, the wire grill 64 can be reduced slightly in size by bringing the sides 65 and 66 toward each other for insertion in the funnel 69. On release of the wire grill 64, because of its resiliency, it is frictionally gripped by the inner surface of the conical body portion 70 and the inner surface of the cylindrical upper end 68. Even though the funnel 69 is turned upside down to permit the removal of the filter 63 and spent coffee grounds, the wire grill 64 remains in place.

As shown more clearly in FIG. 1 of the drawings, the filter 63 is spaced by the resilient wire conical grill 64 from the inner surface of the conical body portion 70 of the funnel 69. As a result of this spacing the filter 63 does not become clogged but rather the flow therethrough of filtered liquid can take place over a relatively large area with the result that the time required for water to pass through the funnel 69 is reduced to a minimum. The funnel 69 is provided with a handle 73 to facilitate removal from and application to the frame of the coffee making machine. The funnel 69 is supported by its radial flange 71 overlying a flange 74 of an arcuate support 75 that is secured by rivets 76 to the depending sides 51 of the hood 50. The flange 74 is spaced below the central portion of the hood 50 a distance slightly greater than the thickness of the flange 71 on the funnel 69, and the latter can be inserted and removed as will be understood.

The liquid coffee that is formed as the result of the spraying of hot water over the ground coffee 62 in the funnel 69 flows downwardly through the discharge opening 72 into a beaker 79 that is located therebelow. The beaker 79 may be a conventional glass beaker provided with a handle 80. The liquid coffee appears therein as indicated at 81. The beaker 79 is positioned on an annular rim 82 that surrounds a scale heater 83 which is employed to maintain the liquid coffee 81 in the beaker 79 at an elevated temperature during the coffee making cycle. The beaker 79 is supported on the annular rim 82, as noted, and it and the scale heater 83 are further supported by a transversely extending plate 84 that is carried by a scale beam indicated, generally, at 87. The scale beam 87 is pivotally mounted at 88 on a frame member 89 which forms a part of the coffee making machine.

After the flow of hot water from the spray head 53 ceases, there is likely to be some drip from the discharge opening 72 of the funnel 69. This is due to the fact that some liquid remains in the ground coffee 62 and in the conical filter paper 63. Often it is desirable that the funnel 69 be removed immediately upon cessation of flow of hot water from the spray head 53. FIGS. 4, 5 and 6 show a construction which can be employed to prevent any drip of liquid through the discharge opening 72 once the funnel 69 is removed from operative position on the flange 74. Here it will be observed that a ball valve 136 is provided at the lower end of the conical portion 70 of the funnel 69. The ball valve 136 is arranged to interfit with a deformed valve surface 137 adjacent the discharge opening 72. The ball valve 136 falls to the position shown in FIG. 6 upon removal of the funnel 69 from the operative position underneath the spray head 53.

In order to control the position of the ball valve 136 an operator 138 in the form of a flexible chain is provided. The chain 138 extends upwardly through a guide sleeve 139 which is suitably secured to the inner surface of the conical body portion 70 of the funnel 69. At its upper end the chain 138 is connected to one arm 140 of a lever 141 which is pivoted at 142 on the handle 73. The other arm 143 of the lever 141 is arranged, when the funnel 69 is positioned underneath the hood 50, to engage a forward edge 144 of a cover 145 (shown by broken lines) that extends over the hood 50. As soon as the funnel 60 is withdrawn slightly from operative position, the weight of the ball valve 136 swings the lever 141 in a clockwise direction, as viewed in FIG. 5, since the other arm 143 is no longer restrained by the forward edge 144 of the cover 145. Accordingly, the ball valve 136 falls to the closed position shown in FIG. 6 and immediately no further flow of liquid coffee can take place through the discharge opening 72.

FIGS. 7 and 8 of the drawings show a construction for the funnel 69 which positively prevents the resilient conical wire grill 64 from disengagement due to the force of gravity when the funnel 69 is turned upside down. While the frictional engagement of the upper portion of the resilient conical wire grill 64 with the cylindrical upper end 68 of the funnel 69 ordinarily is sufficient to hold the wire grill 64 in place, it may be desirable to avoid relying solely on such frictional engagement and provide means for positively preventing this disengagement. It will be observed that the longitudinally extending wires which form the spaced sides 65 and 66 are secured at their upper ends to the uppermost ring 146 of the rings which are employed for holding the longitudinally extending wires in spaced relation. Also it will be observed in FIG. 8 that an opening 147 is provided between the ends of the ring 146. The opening 147 is sufficient to permit these ends to pass a radially inwardly extending grill retaining stud 148 and then permit the resilient conical wire grill 64 to be turned bodily slightly to the position in FIG. 8. The grill retaining stud 148 extends radially inwardly from the cylindrical upper end 68 of the funnel 69. It has a threaded section 149 which extends through the cylindrical upper end 68 and into the handle 73 to secure the latter in position on the funnel 69.

What is claimed as new is:

1. Means for holding ground coffee for use in a coffee making machine comprising, in combination, a funnel having a hollow conical body portion, a resilient conical wire grill in said funnel having spaced longitudinally extending sides and a circularly extending support at its upper end in the form of a radially outwardly stressed resilient split wire ring in frictional engagement with the inner surface of said funnel and with the split being located between said sides whereby said grill is radially expansible at its upper end and overlies and is biased radially outwardly by said split wire ring into the aforesaid frictional engagement, and a disposable conical filter overlying the interior of said conical wire grill and spaced thereby from the inner conical surface of said funnel for receiving the ground coffee at its lower portion.

2. Means for holding ground coffee for use in a coffee making machine comprising, in combination, a funnel having a hollow conical body portion providing an inner conical surface and a cylindrical upper end, a resilient radially expansible conical wire grill overlying said inner conical surface of said funnel and having a cylindrical top section overlying and biased against the inner surface of said cylindrical upper end of said funnel, and a disposable conical paper filter overlying the interior of said conical wire grill and spaced thereby from said inner conical surface of said funnel for receiving the ground coffee at its lower portion, the biasing action applied by said conical grill to the inner surface of said cylindrical upper end of said funnel being sufficient to frictionally hold said conical grill in place when said funnel is turned upside down to discharge said conical paper filter and ground coffee thereon.

3. Means for holding ground coffee for use in a coffee making machine comprising, in combination, a funnel having a hollow conical body portion providing an inner conical surface and a cylindrical upper end, a resilient conical wire grill radially expansible at its upper end and overlying said inner conical surface of said funnel and having spaced longitudinally extending sides and a cylindrical top section overlying and biased against the inner surface of said cylindrical upper end of said funnel, and a disposable conical paper filter overlying the interior of said conical wire grill and spaced thereby from said inner conical surface of said funnel for receiving the ground coffee at its lower portion, said sides of said conical wire grill being unconnected at their upper ends and the biasing action against the inner surface of said cylindrical upper end of said funnel being sufficient to frictionally hold said conical grill in place when said funnel is turned upside down to permit discarding downwardly of said conical filter paper and ground coffee thereon.

4. Means for holding ground coffee for use in a coffee making machine comprising, in combination, a funnel having a hollow conical body portion providing an inner conical surface, a conical grill overlying said inner conical surface of said funnel and having a circularly extending support at its upper end in the form of a split ring the ends of which are spaced apart and having spaced longitudinally extending sides, a disposable conical filter overlying the interior of said conical grill and spaced thereby from said inner conical surface of said funnel for receiving the ground coffee at its lower portion, and means reacting between said funnel and said circularly extending support for holding said conical grill in place when said funnel is turned upside down to discharge said conical filter and ground coffee thereon.

5. Means for holding ground coffee for use in a coffee making machine comprising, in combination, a conical funnel, a conical wire grill overlying the inner conical surface of said funnel, a disposable conical filter overlying the interior of said conical wire grill and spaced thereby from the inner conical surface of said funnel for receiving the ground coffee at its lower portion, and a valve between the apex of said wire grill and the discharge opening of said funnel for closing said opening.

6. The invention, as set forth in claim 5, wherein the valve is in the form of a ball and an annular surface portion thereof has sealing contact engagement with an inner annular surface portion of the funnel.

7. The invention, as set forth in claim 5, wherein the valve is biased by gravity into sealing position and an operator extends from said valve to the upper part of the funnel for lifting said valve to open position.

8. The invention, as set forth in claim 7, wherein the funnel is removably mounted on a support, and there are means operable on positioning of said funnel on said support for tensioning said operator and opening the valve.

9. Means for holding ground coffee for use in a coffee making machine comprising, in combination, a funnel having a hollow conical body portion providing an inner conical surface, a conical grill overlying said inner conical surface of said funnel, a disposable conical filter overlying the interior of said conical grill and spaced thereby from said inner conical surface of said funnel for receiving the ground coffee at its lower portion, and retaining means on said funnel overlying a part of said conical grill for holding it in place when said funnel is turned upside down to discharge said conical filter and ground coffee thereon.

10. Means for holding ground coffee for use in a coffee making machine comprising, in combination, a funnel having a hollow conical body portion providing an inner conical surface and a cylindrical upper end, a conical grill overlying said inner conical surface of said funnel, a disposable conical filter overlying the interior of said conical grill and spaced thereby from said inner conical surface of said funnel for receiving the ground coffee at its lower portion, and a stud projecting radially inwardly from said cylindrical upper end of said funnel and overlying said conical grill for holding it in place when said funnel is turned upside down to discharge said conical filter and ground coffee thereon.

11. Means for holding ground coffee for use in a coffee making machine comprising, in combination, a funnel having a hollow conical body portion providing an inner conical surface, a conical grill overlying said inner conical surface of said funnel and having a circularly extending support at its upper end in the form of a split ring the ends of which are spaced apart and having spaced longitudinally extending sides, a disposable conical filter overlying the interior of said conical grill and spaced thereby from said inner conical surface of said funnel for receiving the ground coffee at its lower portion, and a stud projecting radially inwardly from said funnel beyond which the spaced ends of said split ring can be passed and then circumferentially turned to position said circularly extending support in overlying relation to said stud for holding said conical grill in place when said funnel is turned upside down to discharge said conical filter and ground coffee thereon.

References Cited in the file of this patent

UNITED STATES PATENTS

| 162,294 | Leiner | Apr. 20, 1875 |
| 189,929 | Fenner | Apr. 24, 1877 |
| 532,072 | Kister | Jan. 8, 1895 |
| 596,972 | Anders | June 11, 1898 |

FOREIGN PATENTS

| 28,691 | Great Britain | Dec. 8, 1909 |